United States Patent
Ho

(10) Patent No.: US 7,198,199 B2
(45) Date of Patent: Apr. 3, 2007

(54) DUAL UNIVERSAL INTEGRATED CIRCUIT CARD (UICC) SYSTEM FOR A PORTABLE DEVICE

(76) Inventor: Chun-Hsin Ho, 9F-4, No. 375, Shin-Yi Rd., Sec. 4, Taipei (TW)

( * ) Notice: Subject to any disclaimer, the term of this patent is extended or adjusted under 35 U.S.C. 154(b) by 137 days.

(21) Appl. No.: 11/051,857

(22) Filed: Feb. 4, 2005

(65) Prior Publication Data

US 2006/0175416 A1    Aug. 10, 2006

(51) Int. Cl.
*G06K 19/06* (2006.01)

(52) U.S. Cl. ................................ 235/492; 235/441

(58) Field of Classification Search ................ 235/492, 235/441, 379, 486, 380, 493, 439, 375; 340/5.52, 340/5.25, 5.74
See application file for complete search history.

(56) References Cited

U.S. PATENT DOCUMENTS

| | | | | |
|---|---|---|---|---|
| 4,562,535 A | | 12/1985 | Vincent et al. | 364/200 |
| 6,029,892 A | * | 2/2000 | Miyake | 235/380 |
| 6,173,900 B1 | * | 1/2001 | Yoshigi et al. | 235/492 |
| 6,341,069 B1 | | 1/2002 | Torlotin | 361/737 |
| 6,532,158 B1 | | 3/2003 | Buttet | 361/796 |
| 6,581,830 B1 | * | 6/2003 | Jelinek et al. | 235/441 |
| 6,607,127 B2 | * | 8/2003 | Wong | 235/451 |
| 6,786,417 B1 | * | 9/2004 | Kondo et al. | 235/492 |
| 6,811,082 B2 | * | 11/2004 | Wong | 235/451 |
| 2003/0006878 A1 | * | 1/2003 | Chung | 340/5.25 |
| 2004/0015738 A1 | * | 1/2004 | Chang | 714/30 |
| 2004/0087213 A1 | * | 5/2004 | Kao | 439/638 |
| 2005/0212657 A1 | * | 9/2005 | Simon | 340/5.74 |
| 2005/0231921 A1 | * | 10/2005 | Noda et al. | 361/737 |
| 2006/0047961 A1 | * | 3/2006 | Hashimoto et al. | 713/173 |

FOREIGN PATENT DOCUMENTS

| | | |
|---|---|---|
| EP | 0840247 B1 | 5/1998 |
| EP | 0845837 B1 | 6/1998 |
| EP | 1079324 A1 | 8/1999 |

* cited by examiner

*Primary Examiner*—Thien M. Le
(74) *Attorney, Agent, or Firm*—Kusner & Jaffe

(57) ABSTRACT

The present invention discloses the dual universal integrated circuit cards (UICC) system for a portable device, the portable device includes a cellular phone or a personal digital assistance. The system comprises a slayer integrated circuit (IC) card having a first integrated circuit (IC). A substrate is carrying for a master integrated circuit (IC) card having a second integrated circuit (IC) and a contact interface. The contact interface is coupled to the first and second integrated circuit (IC). An antenna is coupled to the second integrated circuit (IC) for transmitting information.

8 Claims, 2 Drawing Sheets

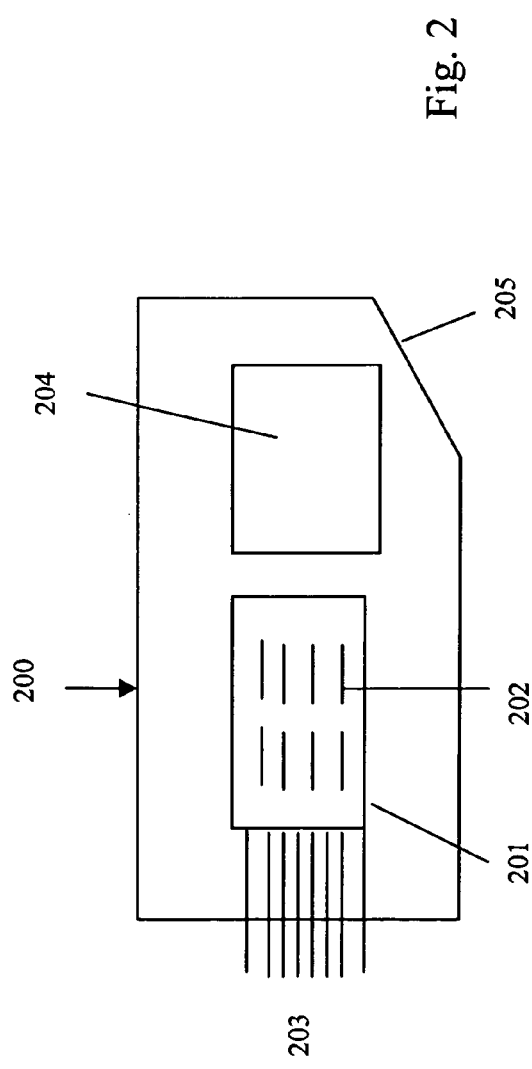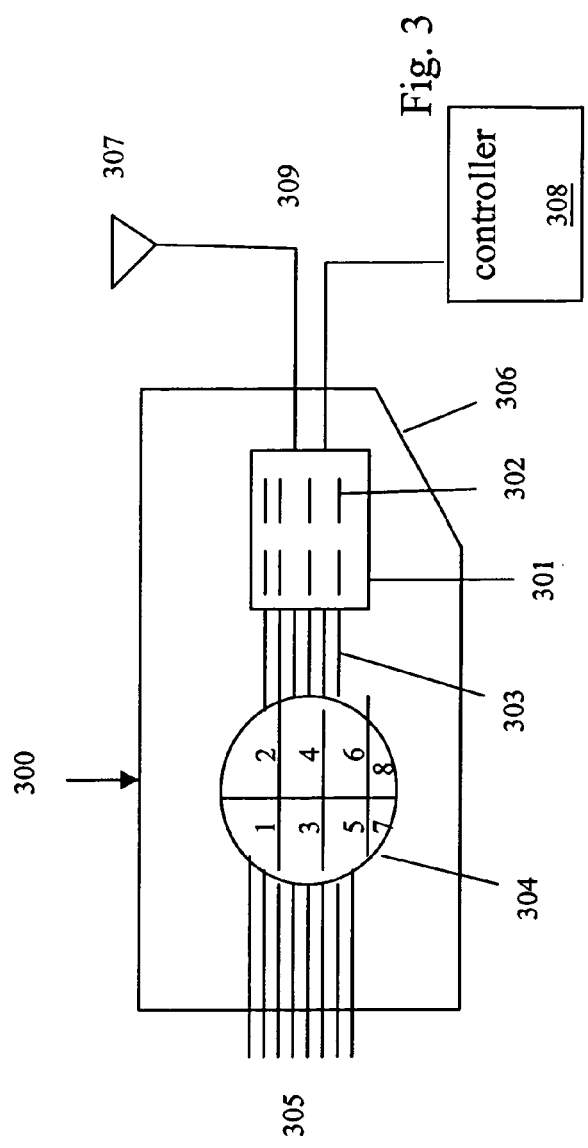

DUAL UNIVERSAL INTEGRATED CIRCUIT CARD (UICC) SYSTEM FOR A PORTABLE DEVICE

FIELD OF THE INVENTION

The present invention relates to a subscriber identity module (SIM), and more specifically, to the SIM that is capable of coupling an antenna for contactless application.

BACKGROUND OF THE INVENTION

Telecommunication networks have been established for providing a variety of services to network subscribers. Some widely used and well-known service provided by the telecommunication networks is mobile phone services, such as with cellular telephones. Surface contact cards having special circuits are widely used in electronic devices to enhance the functions of the electronic devices. For example, a subscriber identity module (SIM) card is placed in a portable phone to dedicate the phone's functions to the SIM card owner. By changing SIM cards, a single phone can be used by many SIM card owners as a personal phone. Other telecommunication networks provide services that involve banking operations and transaction functions. One way for providing secure transmissions is to use a subscriber identification module ("SIM") that can be plugged into or detached from the cellular phone. Data stored in the SIM controls access by the phone to the network service. Recent versions of the SIM include an interpreter of programs written in a high-level computer language, such as JAVA. Such a SIM is disclosed by the European Telecommunications Standards Institute (ETSI) in its GSM Technical Specification GSM 11.11 of July 1996, Version 5.3.0, which is hereby incorporated by reference. As it is known, the SIM contains the mobile subscriber identification (IMSI), the individual subscriber key (Ki), an authentication algorithm, a personal identification number (PIN) and other permanent and temporary data.

As aforementioned, the SIM cards are most commonly used in communication devices to enable a user to access an individual account or a particular wireless telephone network in a specific country. Each SIM card contains the configuration information for a designated network, and also contains information identifying the user, such as the user's mobile telephone number. The identity or memory card is inserted into the body of the mobile telephone via a user-accessible interface, typically formed in or on a surface of the mobile phone housing, such as the surface that is covered by and contacts a detachable battery pack of the phone. When inserted into the telephone, the card is electrically connected to the internal circuitry of the mobile phone, thus enabling the mobile phone to access information from the identification/memory card. A conventional mechanism for holding a SIM card includes a base made of insulating material and a cover pivotally attached to the base. The base is mounted on a printed circuit board (PCB) of a mobile phone and comprises a plurality of pin contacts. The cover is rotated upwardly to an open position, and the SIM card is inserted into receiving grooves that are provided on opposite sides of the cover. Then, the cover is rotated downwardly to the closed position so that the contact pads of the SIM card are brought into electrical contact with the pin contacts on the base.

Portable integrated electronic cards are typically provided with standardized dimensions with the chip positioned in a predetermined location relative to the edges of the card, depending on the type of electronic device. SIM cards are generally provided in one of two sizes, i.e., a full-sized or ISO size card, and a micro or plug-in sized card. The full sized card is approximately the size of a standard credit card, while the plug-in size is approximately 25 mm long and 15 mm wide, and less than 1 mm thick. To ensure correct orientation of a plug-in sized SIM card upon insertion in the mobile phone, one corner of the otherwise rectangular card is cut at an angle, so that the length of one edge of the card is reduced to about 21 mm while the width of the adjacent edge is reduced to about 12 mm. The card can only be inserted in the phone with an angled corner in the correct direction.

As known in the art, a contactless transaction card includes an integrated circuit and an antenna embedded inside the card. The antenna is typically looped or wound in a pattern configuration. The reading of information to or from a contactless transaction card is achieved by RF signals transmitted by the antenna. At present, contactless transaction card is provided in the form of credit card-sized and is carried in a person's pocket. What is need is to provide a contactless transaction card in a size that is easily and conveniently stored in a mobile phone.

SUMMARY OF THE INVENTION

In view of above-mentioned, the object of the present invention is to disclose a dual universal IC cards (UICC) system with the contactless transaction function.

Another object of the present invention is to disclose a dual universal IC card (UICC) system with the post-issued STK (SIM Tool Kit) application, such as mobile banking, mobile stock trading etc.

The other object of the present invention is to disclose a dual universal IC card (UICC) system with the extended memory for SIM application.

The yet object of the present invention is to disclose a dual universal IC card (UICC) system with the NFC (Near Field Communication) service.

According to the above object, the present invention discloses the dual universal integrated circuit cards (UICC) system for a portable device, the portable device includes a cellular phone or a personal digital assistance. The system comprises a slayer integrated circuit (IC) card having a first integrated circuit (IC). A substrate is used for carrying a master integrated circuit (IC) card having a second integrated circuit (IC) and a contact interface. The contact interface is coupled to the first and second integrated circuit (IC). An antenna is coupled to the second integrated circuit (IC) for transmitting information.

Wherein the antenna is separable from or embedded into the substrate and is adapted to the Universal Integrated Circuit Card (UICC) including SIM, USIM, UIM and RUIM etc. standard.

The first integrated circuit (IC) is a SIM (Subscriber Identity Module). The second integrated circuit (IC) is a control integrated circuit (IC), SIM (Subscriber Identity Module) or memory.

The system further comprises the portable device controller coupled to the second integrated circuit (IC) for controlling the first or second integrated circuit (IC).

The system further comprises conductive wires to connect to the first and second integrated circuit (IC), respectively.

Further, the dual universal integrated circuit cards (UICC) system for a portable device comprises a slayer integrated circuit (IC) card having a first integrated circuit (IC) with a first plurality of I/O terminals. A substrate is carrying for a master integrated circuit (IC) card connected to the slayer integrated circuit (IC) card. The master integrated circuit (IC) card has a plurality of I/O contacts and a second integrated circuit (IC). The second integrated circuit (IC) has a second plurality of I/O terminals. The plurality of I/O contacts are coupled to the first and second plurality of I/O terminals respectively. An antenna is coupled to the second integrated circuit (IC) for transmitting information.

The slayer integrated circuit (IC) card has an opening allowing for accommodating the second integrated circuit (IC). The first integrated circuit (IC) is a SIM (Subscriber Identity Module). The second integrated circuit (IC) is a control integrated circuit (IC), SIM (Subscriber Identity Module) or memory. The memory is an EEPROM.

The system further comprises the portable device controller coupled to the second integrated circuit (IC) for controlling the first or second integrated circuit (IC).

The system further comprises conductive wires to connect to the first and second plurality of I/O terminals, respectively.

The second plurality of I/O terminals are employed to communicate between a mobile telephone service system and said master integrated circuit (IC) card. The second plurality of I/O terminals are employed to communicate between a contactless transaction service system and said master integrated circuit (IC) card.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 shows a slayer UICC according to the present invention.

FIG. 3 shows a master UICC according to the present invention.

DETAILED DESCRIPTION OF THE PREFERRED EMBODIMENT

Figure 1:
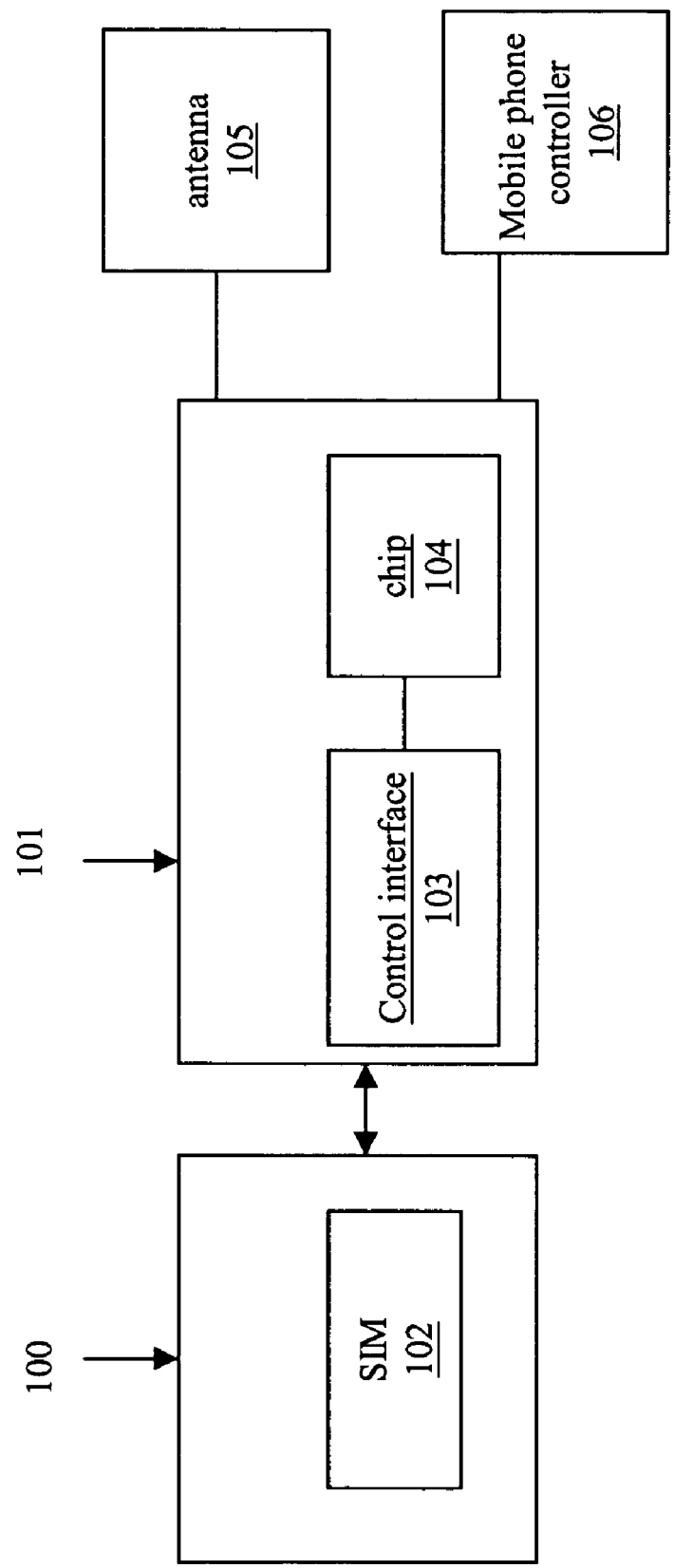
FIG. 1 is the dual UICC system according to the present invention.

Referring now to the drawings and the following description wherein the showings and description are for the purpose of illustrating the preferred embodiments of the present invention only, and not for the purpose of limiting the same.

FIG. 1 shows a dual UICC system for a portable device according to the present invention. The portable device includes a cellular phone or a personal digital assistance. The dual UICC system comprises a slayer integrated circuit (IC) card 100, a master integrated circuit (IC) card 101. Both of the IC cards could be inserted in the SIM sockets. The master integrated circuit (IC) card 101 is coupled to an antenna 105 and a portable device controller 106. The slayer IC card 100 has an integrated circuit chip 102 mounted on one surface of the card 100. For example, the integrated circuit chip 102 includes SIM, USIM, UIM or RUIM etc. The master integrated circuit (IC) card 101 includes a contact interface 103 and chip or memory 104. The chip 104 is preferred a flip chip. The contact interface 103 may be coupled to the integrated circuit chip 102 and flip chip 104. The flip chip 104 may be embedded into a laminated circuit board (LCB). In one embodiment, the flip chip 104 may act as a controller integrated circuit (IC) to control the integrated circuit chip 102 of the slayer integrated circuit (IC) card 100 through the contact interface 103. That is, the original (U) SIM 102 acts as a slayer of the flip chip 104. And, the flip chip 104 may be a memory, such as EEPROM to store data such that the dual UICC system has a memory extension function for SIM applications, such as advanced phonebook, SMS etc. Besides, the flip chip 104 may be a SIM, USIM, UIM or RUIM etc., therefore the dual UICC system may be processed double SIM function to allow the mobile phone to receive the signals from two different or identical communication system. An external antenna 105 can be connected with the flip chip 104 of the LCB for near field communication (contactless applications). The LCB with flip chip 104 contacts with the contact surface of the original (U) SIM 102 and interacts with a portable device, such as a mobile phone, terminal directly. That is, the LCB with flip chip 104 forms a direct contact circuit from the flip chip 104 to the mobile phone terminal. Moreover, a mobile phone controller 106 may control the flip chip 104 directly to perform some function. According to the application resided in the flip chip 104, the flip chip 104 actually intercepts specific communication signals between the mobile phone terminal and the original (U) SIM 102 and reforms the responses signal from the (U) SIM 102 to the mobile phone terminal to perform add-on application, such as additional subscription, a post-issued STK (SIM Tool Kit) application i.e. mobile banking, mobile stock trading etc. The flip chip 104 integrates the STK (SIM Tool Kit) menu of the original (U) SIM 102 if any with its own one which contains the add-on application.

FIG. 2 shows a slayer IC card according to the present invention. The slayer IC card 200 having an integrated circuit chip 201 mounted on or embedded into one surface of the card 200, and a cut corner 205 for guiding the user to insert the card 200 in an appropriate direction. As known in the art, the cut corner 205 is for guiding insertion into a SIM card 200 carrier or holder, precisely. For example, the integrated circuit chip 201 includes SIM, USIM, UIM or RUIM etc. The integrated circuit chip 201 is well-known in the art, therefore, the detailed description will be omitted. The substrate material for the SIM 201 may be made from a plastic material similar to those used in credit cards or transaction cards. Preferably, the material, in one example, the shape and dimension of the SIM Card 200 is adapted to the standard SIM card. The information stored in the slayer IC card 200 can be accessed when the SIM 201 is in physical contact to the contact pins of the electronic device. The slayer IC card 200 includes a SIM, USIM, UIM or RUIM card etc. The typical SIM card 200 uses six terminals 202 to contact to the six pins of the portable device's connector through conductive wires 203.

The SIM card 200 may has an opening 204 allowing for accommodating another integrated circuit (IC) chip.

As shown in FIG. 3, it shows a master IC card according to the present invention. The master IC card 300 having a flip chip 301 mounted on or embedded into one surface of the card 300, a plurality of I/O contacts 304, and a cut corner 306 for guiding the user to insert the card 300 in an appropriate direction. The flip chip 104 may be embedded into a laminated circuit board (LCB). The flip chip 301 includes a plurality of terminals 302 for connecting to the leads of the portable communication device such as the cellular phone.

Besides, a niche on the plug-in SIM 201 may be developed to fit in the flip chip 301. I/O contact pins of the original (U) SIM 201 may be redirected to the flip chip 301 by the LCB. Power contact pins can also be redirected to the flip chip 301 for advantaged power management.

A feature of the present invention is that the flip chip 301 is coupled to the integrated circuit chip 201 through the I/O contacts 304 via conductive wires 203,303 and 305. In one embodiment, the flip chip 301 may act as a controller integrated circuit (IC) to control the integrated circuit chip 201 of the slayer integrated circuit (IC) card 200 through the I/O contacts 304. Number of the I/O contacts 304 is not limited. For example, number of the I/O contacts 304 is six (1, 2, 3, 4, 5, 6), contacting Vcc, GND, RST, VPP, I/O and CLK, respectively. That is, the original (U) SIM 201 acts as a slayer of the flip chip 301. And, the flip chip 301 may be a memory, such as EEPROM to store data such that the dual UICC system has a memory extension function for SIM applications, such as advanced phonebook, SMS etc.

Besides, the flip chip 301 may be a SIM, USIM, UIM or RUIM etc., therefore the dual UICC system may be processed double SIM function. SIM cards 200,300 are most commonly used in communication devices to enable a user to access an individual account or a particular wireless telephone network. Each card contains the configuration information for a designated network, and also contains information identifying the user, such as the user's mobile telephone number, and related account information.

Due to the ability of the flip chip 301 to communicate with a processor of the device via the transmission or reception of electromagnetic signals through the air using RF module of the portable communication device, the service provider may identify the user code or the device code in the card 300. In this manner, the service provider may determine the communication parameters of the card 300. The flip chip 301 transmits and receives information in the form of electrical signal through the device.

Besides, an external antenna 307 can be connected with the flip chip 301 of the LCB for near field communication (contactless applications). The LCB with flip chip 301 contacts with the terminals 202 of the original (U) SIM 201 and interacts with a portable device, such as a mobile phone, terminal directly. That is, the LCB with flip chip 301 forms a direct contact circuit with the mobile phone terminal. Based on functions, such as controlling, storing or SIM, of the flip chip 301, the master IC card 300 may control function of the slayer IC card 200. Moreover, a mobile phone controller 308 may control the flip chip 301 directly to perform some function. According to the application resided in the flip chip 301, the flip chip 301 actually intercepts specific communication signals between the mobile phone terminal and the original (U) SIM 201 and reforms the responses signal from the (U) SIM 201 to the mobile phone terminal to perform add-on application, such as additional subscription, a post-issued STK (SIM Tool Kit) application i.e. mobile banking, mobile stock trading etc. The flip chip 301 integrates the STK (SIM Tool Kit) menu of the original (U) SIM 201 if any with its own one which contains the add-on application.

The flip chip 301 is connected with an antenna 307 so that electromagnetic signals can be transmitted to and from the flip chip 301. The master IC card 300 communicates with a reader or writer device via the transmission or reception of electromagnetic signals through the ambient air using the antenna 307. It should be noted that the antenna 307 is different from the antenna of the portable communication device. It is a low power transmission antenna for contactless or Near Field Communication (NFC). Namely, the antenna is adapted to the UICC standard or Near Field Communication (NFC) standard. Contactless transaction provides advantages over contact-type cards, such as faster transaction times and ease of use.

The antenna 307 is extending from the flip chip 301. The antenna 307 is incorporated to the card by coupling via the wires, conductive traces 309 or by being looped or wound in a pattern in a lower plane of the card. The wires of the antenna 307 may connect to the conductive traces 309 by conventional manner. Alternatively, it maybe formed on the cell phone substrate or body.

The transfer or reading of information to or from for contactless transaction via the master IC card 300 is achieved by sending RF signals through the antenna 307 extending from the flip chip 301. The user simply brings the master IC card 300 with the function of contactless transaction close to a card reader within a range, the reader is enabled to read the identification data contained in the IC via the antenna 307.

When a contactless transaction is used in a transportation system, the IC mounted in the card contains the user's account information or billing information. Under the operation, the user may access or update the user's account. The master IC card 300 and slayer IC card 200 may be detachably from the holder of the portable device as known in the art. The master IC card 300 and slayer IC card 200 may be formed of a plastic material. The card holder may be sized and shaped to substantially correspond to the size and shape of master IC card 300 and slayer IC card 200.

Antenna may also be formed on or in the substrate of the cellular. For example, antenna can be provided as a length of a filament or wire, which may be deposited by printing.

The aforementioned, the terminals 302 may be employed to communicate between a mobile telephone service system or contactless transaction and the master integrated circuit (IC) card 300.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A dual universal integrated circuit card system for a portable mobile device comprising:
    an integrated circuit card having a first chip embedded therein; and
    a laminated circuit board having a second chip and a contact interface that contacts said first chip to allow said first chip for connecting to said second chip on said laminated circuit board, thereby controlling said integrated circuit card by said laminated circuit board, wherein said integrated circuit card has an opening formed therethrough for accommodating said second chip on said laminated circuit board.

2. The system of claim 1, further comprising an antenna coupled to said second chip.

3. The system of claim 1, wherein said integrated circuit card and said laminated circuit board are inserted into a socket of said portable mobile device.

4. The system of claim 1, wherein said first chip and said second chip are integrated circuits of a Subscriber Identity Module, Universal Subscriber Identity Module, User identification module or Removable User Identity Module.

5. The system of claim 1, further comprising a portable mobile device controller coupled to said second chip for controlling said first chip or said second chip.

6. A laminated circuit board for a dual universal integrated circuit card system with an integrated circuit card having a first chip embedded therein, comprising:
   a second chip; and
   a contact interface that contacts said first chip when combined to allow said first chip to connect to said second chip on said laminated circuit board, thereby controlling said integrated circuit card by said laminated circuit board, whereby said integrated circuit card and said laminated circuit board can be inserted into a socket of a portable device when combined.

7. The laminated circuit board of claim 6, wherein said second chip is coupled to an antenna.

8. The laminated circuit board of claim 6, wherein said second chip is coupled to a portable mobile device controller for controlling said first chip or said second chip.

* * * * *